United States Patent
Feder

(10) Patent No.: US 11,432,524 B2
(45) Date of Patent: Sep. 6, 2022

(54) COUNTERTOP COOKING APPLIANCE

(71) Applicant: Glen Andrew Feder, Millburn, NJ (US)

(72) Inventor: Glen Andrew Feder, Millburn, NJ (US)

(*) Notice: Subject to any disclaimer, the term of this patent is extended or adjusted under 35 U.S.C. 154(b) by 931 days.

(21) Appl. No.: 16/226,610

(22) Filed: Dec. 19, 2018

(65) Prior Publication Data

US 2019/0183087 A1 Jun. 20, 2019

Related U.S. Application Data

(60) Provisional application No. 62/607,707, filed on Dec. 19, 2017.

(51) Int. Cl.
*A01J 25/15* (2006.01)
*A01J 25/11* (2006.01)
*A01J 25/00* (2006.01)
*A47J 43/00* (2006.01)
*A01J 25/06* (2006.01)

(52) U.S. Cl.
CPC ............ *A01J 25/15* (2013.01); *A01J 25/001* (2013.01); *A01J 25/06* (2013.01); *A01J 25/11* (2013.01); *A01J 25/115* (2013.01); *A47J 43/00* (2013.01)

(58) Field of Classification Search
CPC .......... A01J 25/001; A01J 25/02; A01J 25/06; A01J 25/10; A01J 25/11; A01J 25/115; A01J 25/15

See application file for complete search history.

(56) References Cited

U.S. PATENT DOCUMENTS

| 4,693,610 A * | 9/1987 | Weiss ............ A47J 43/044 |
| | | 99/348 |
| 4,802,407 A | 2/1989 | Negri et al. |
| 6,213,007 B1 | 4/2001 | Lande |
| 6,280,781 B1 | 8/2001 | Lande |
| 8,534,189 B2 | 9/2013 | Pavero |
| 2009/0223385 A1 | 9/2009 | Heald |
| 2010/0263551 A1 | 10/2010 | Pavero |

FOREIGN PATENT DOCUMENTS

| CN | 107801786 A * | 3/2018 | ............ A01J 25/13 |
| EP | 0470515 A1 * | 2/1992 | ............ A01J 25/06 |
| KR | 200429212 Y1 * | 10/2006 | ............ A01J 25/15 |
| WO | WO1991015143 A1 | 10/1991 | |
| WO | WO2017007211 A1 | 1/2017 | |

* cited by examiner

Primary Examiner — John J Norton

(57) ABSTRACT

A countertop cooking appliance is an apparatus that is used to manufacture food, particularly cheeses, with controlled heating, mixing, drainage, and pressure cycles. The apparatus is also configured to accept various cooking patterns for different foods based on different recipes. A perforated drainer is used to hold ingredients for mixing, completed cheese curds, and the finalized cheese product. A first receptacle is a container that holds the perforated drainer and temporarily stores whey and process byproducts. A second receptacle is a storage unit for whey and other liquid byproducts produced in the cheese development process. A fluid pump applies pressure to fluids collected in the first receptacle, transferring them to the second receptacle. A linear actuator provides mechanical power to one of several detachable food-interacting heads, which consequently chops, mixes, or otherwise agitates the contents of the perforated container.

20 Claims, 11 Drawing Sheets

COUNTERTOP COOKING APPLIANCE

The current application claims a priority to the U.S. Provisional Patent application Ser. No. 62/607,707 filed on Dec. 19, 2017.

FIELD OF THE INVENTION

The present invention generally relates to food devices. More particularly, the present invention is a cheese-making countertop cooking appliance which includes a touch-screen display that allows the user to choose from various default recipes of cheese. Additionally, the present invention can be synced to a software application to share and receive custom recipes with other users.

BACKGROUND OF THE INVENTION

The human species would never have survived through winter without harnessing the preservative power of natural fermentation and enjoying the consequent nutritional improvements. Through processes that typically involve the addition and use of salts, acids, and temperature-controlled environments, vegetables, meats, and dairy products could develop into krauts, cured meats, and cheeses, each of which contains a wide array of probiotic benefits. Trends in mass food manufacturing, however, have borne the elimination of such methods due primarily to their reliance on complicated bacterial processes. While fermentation done properly is harmless and nutritionally beneficial, improper fermentation can lead to the development of various molds and bacteria that are dangerous for humans to consume. Therefore, mass-produced foods are now often developed with artificial preservatives, thus depriving the resultant foods of not only their beneficial probiotic benefits but also much of their flavor.

In response to the challenges presented by mass food production, social trends indicate a reversion to the old methods of fermentation, with a few modern improvements. Sauerkrauts, kimchis, pickles, beers, and many other foods and drinks can be created by an individual with little expertise and a small amount of equipment. Unfortunately, a simple process for making cheese at home consistently and safely remains elusive. Purchasing pre-made cheese means the user has no control in taste, freshness, or quality; however, with lack of a better option, this is often standard practice. Among the many challenges present in the cheese-making process, the maker has to worry about managing heat, adding appropriate amounts of ingredients, timing, draining whey, and, in many cases, applying constant pressure. Cheese-making devices are large and expensive, typically being designed for commercial as opposed to individual use. What is needed is a countertop device that can accept ingredients and instructions and can automatically deliver homemade cheeses. Further desirable is a device that provides a variety of cheese-making instructions for different cheeses.

The present invention addresses these issues. The present invention utilizes a touch-screen interface to allow the user to input instructions or select from a variety of existing recipes online. Additionally, the present invention can be synchronized with a software application to share and receive custom recipes with other users. The present invention includes a heating element for heating the ingredients of the cheese at appropriate times during the process. A specialized grid cutter is used to both mix ingredients during the liquid stages and to cut the curd in the later stages of the cheese-making process. A pressing assembly can be added to allow the user to provide constant, even pressure to their cheese for the formation of hard cheeses. The present invention pumps excess whey byproduct into a tank for disposal or subsequent processing by the user. Due to the controlled environment created by the present invention, the present invention can further be utilized for the creation of tofu, and even as a sous vide.

DETAILED DESCRIPTION OF THE INVENTION

All illustrations of the drawings are for the purpose of describing selected versions of the present invention and are not intended to limit the scope of the present invention.

Figure 1:
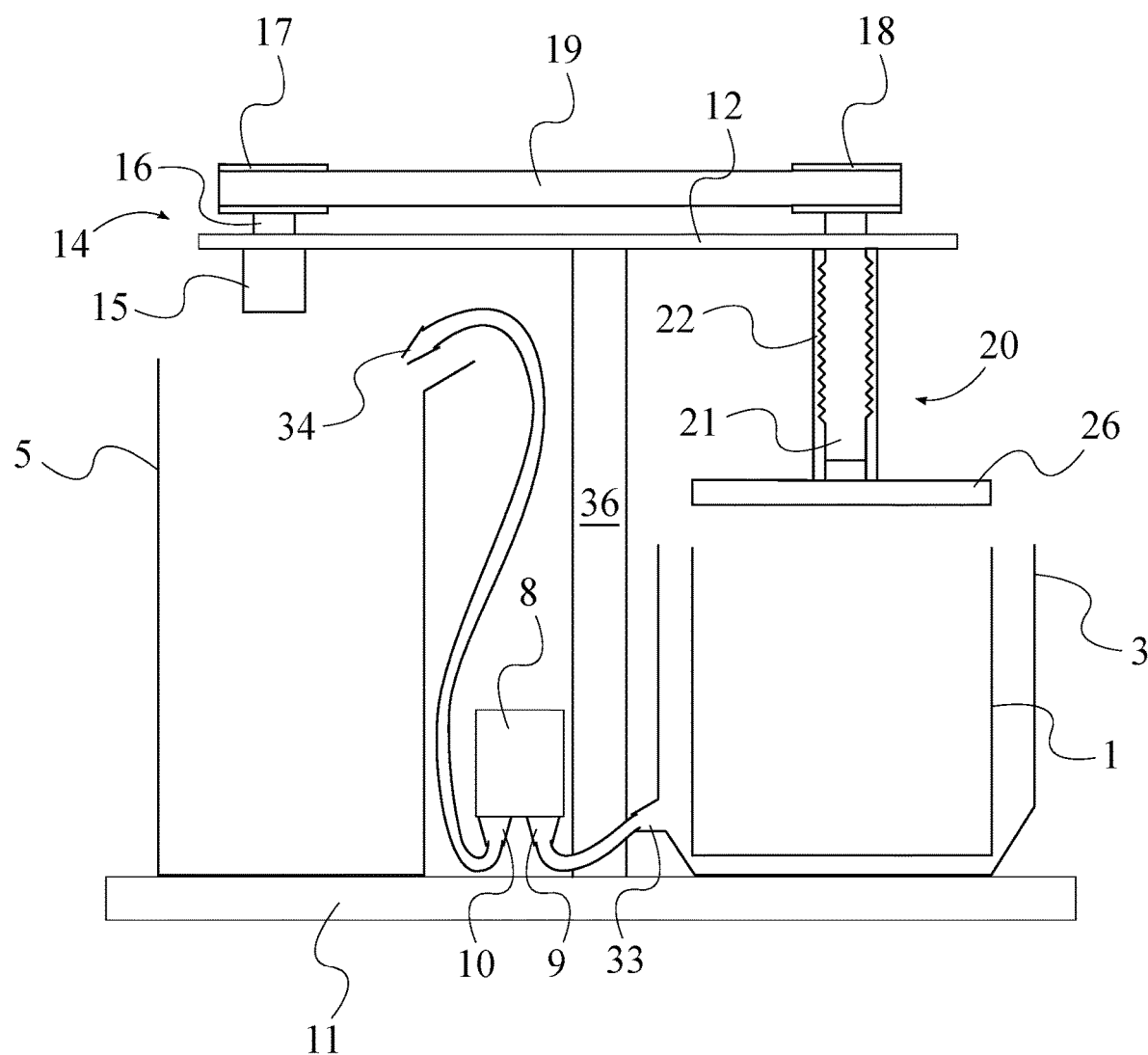
FIG. 1 is a side schematic view representing the present invention.

The present invention is a countertop cooking appliance that is used to manufacture food, particularly cheeses, with controlled heating, mixing, drainage, and pressure cycles. The present invention is also configured to accept various cooking patterns for different foods based on different recipes. The present invention comprises a perforated drainer 1, a first receptacle 3, a second receptacle 5, a fluid pump 8, a structural base 11, a structural boom 12, a linear actuator 13, a heater 24, a controller 25, and at least one interchangeable food-interacting head 26. The perforated drainer 1 is a container used to hold ingredients for mixing, cheese curds, and the finalized cheese product. The first receptacle 3 is a container that holds the perforated drainer 1 and temporarily stores whey and process byproducts, as seen in FIG. 1. The second receptacle 5 is a storage unit for whey and other liquid byproducts produced in the cheese development process. The fluid pump 8 is a mechanical unit that applies pressure to fluids collected in the first receptacle 3. The structural base 11 is a rigid unit with high-friction gripping feet that allows for arrangement of the first receptacle 3 and the second receptacle 5. The structural boom 12 is a rigid unit that swivels in order to rearrange the linear actuator 13 relative to the first receptacle 3 and the second receptacle 5.

The linear actuator 13 is used to move the at least one interchangeable food-interacting head 26 in an up-and-down reciprocating motion in order to manipulate the contents of the perforated drainer 1. The heater 24 is a temperature-controlling mechanism that allows for control over the temperature of the contents of the perforated drainer 1. The controller 25 is an electrical unit capable of converting electrical inputs from sensors and instructions and converting them into electrical signals for the fluid pump 8, the linear actuator 13, and the heater 24. The at least one interchangeable food-interacting head 26 is a set of components that allows the linear actuator 13 to press, cut, mix, or otherwise interact with the contents of the perforated drainer 1.

The general configuration of the aforementioned components allows the present invention to efficiently and effectively create cheese from basic ingredients and instructions. The first receptacle 3, the second receptacle 5, and the fluid pump 8 are mounted onto the structural base 11, as seen in FIG. 1. In this way, the first receptacle 3, second receptacle 5, and fluid pump 8 are positioned proximally to each other. The perforated drainer 1 is situated within the first receptacle 3. This arrangement allows the liquid contents of the perforated drainer 1 to collect in the first receptacle 3. The heater 24 is in thermal communication with the first receptacle 3. In this way, the temperature of the first receptacle 3, and consequently, the perforated drainer 1 and contents within, is controlled by the heater 24. The first receptacle 3 and the second receptacle 5 are in fluid communication with each other through the fluid pump 8. This arrangement allows for fluids to flow from the first receptacle 3 into the second receptacle 5. The structural boom 12 is rotatably connected to the structural base 11. In this way, the structural boom 12 is free to rotate relative to the structural base 11. The structural boom 12 is positioned offset from the first receptacle 3 and the second receptacle 5. This arrangement enables the structural boom 12 to rotate without interfering with the positions of the first receptacle 3 and the second receptacle 5. The at least one interchangeable food-interacting head 26 is operatively mounted to the structural boom 12 by the linear actuator 13, wherein the linear actuator 13 is used to slide the at least one interchangeable food-interacting head 26 into and out of the perforated drainer 1. In this way, the at least one interchangeable food-interacting head 26 interacts with the contents of the perforated drainer 1 through an up-and-down reciprocating motion. The controller 25 is electronically connected to the heater 24, the fluid pump 8, and the linear actuator 13. This arrangement ensures that the controller 25 can communicate signals between the heater 24, fluid pump 8, and linear actuator 13.

Figure 3:
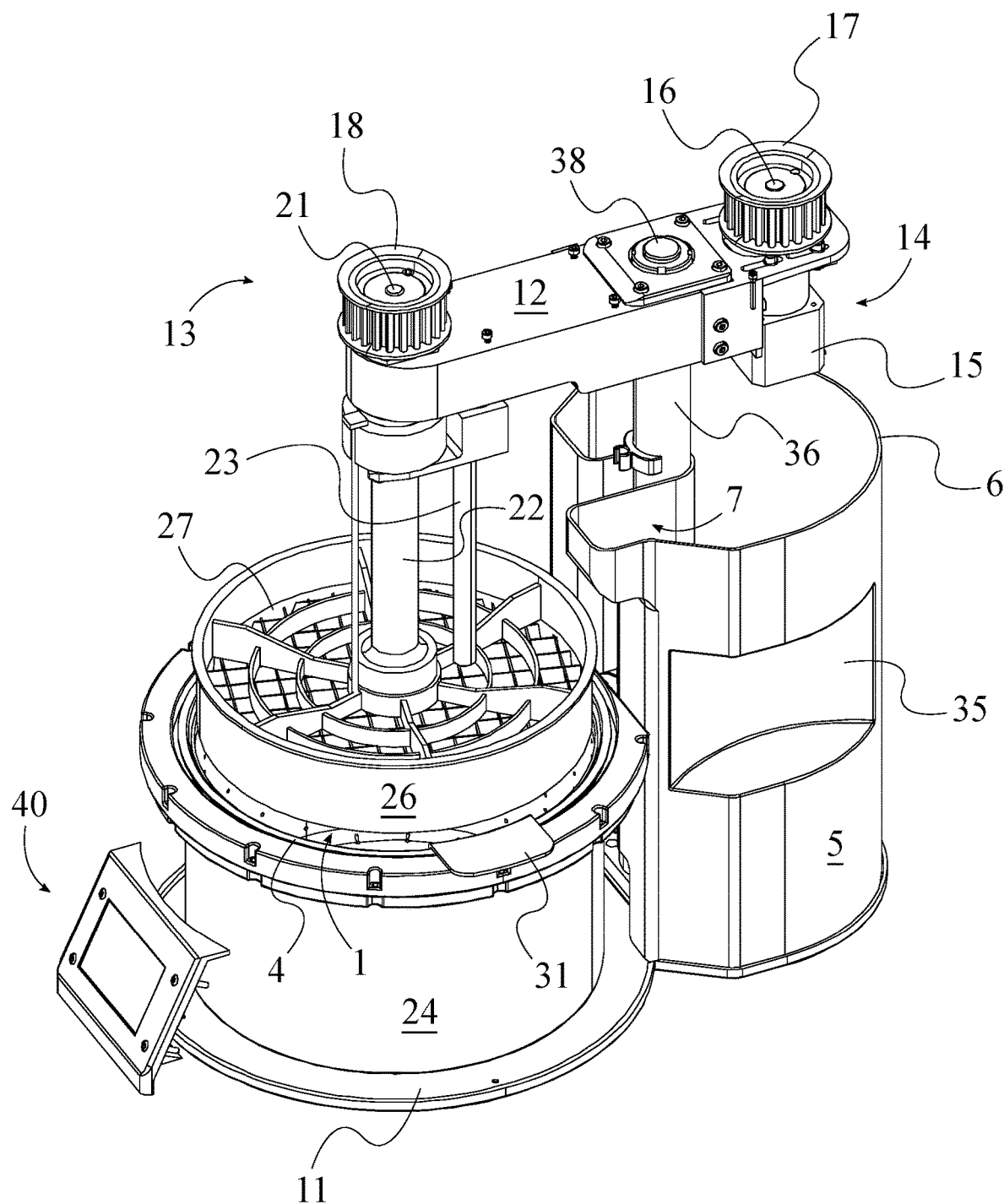
FIG. 3 is a front-right perspective view of the present invention without the cover.
Figure 10:
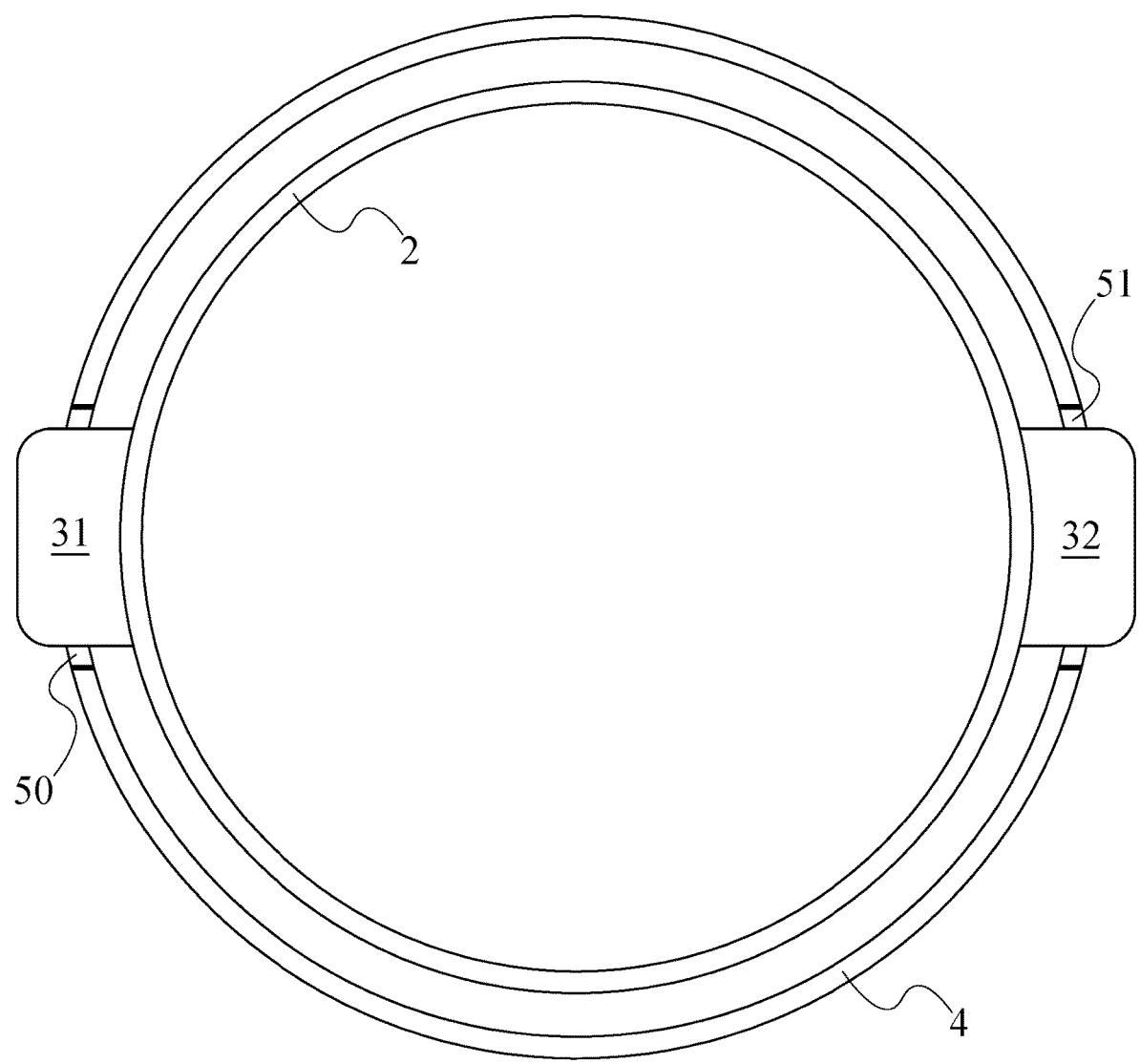
FIG. 10 is a top schematic view representing the perforated drainer of the present invention situated within the first receptacle.
Figure 11:
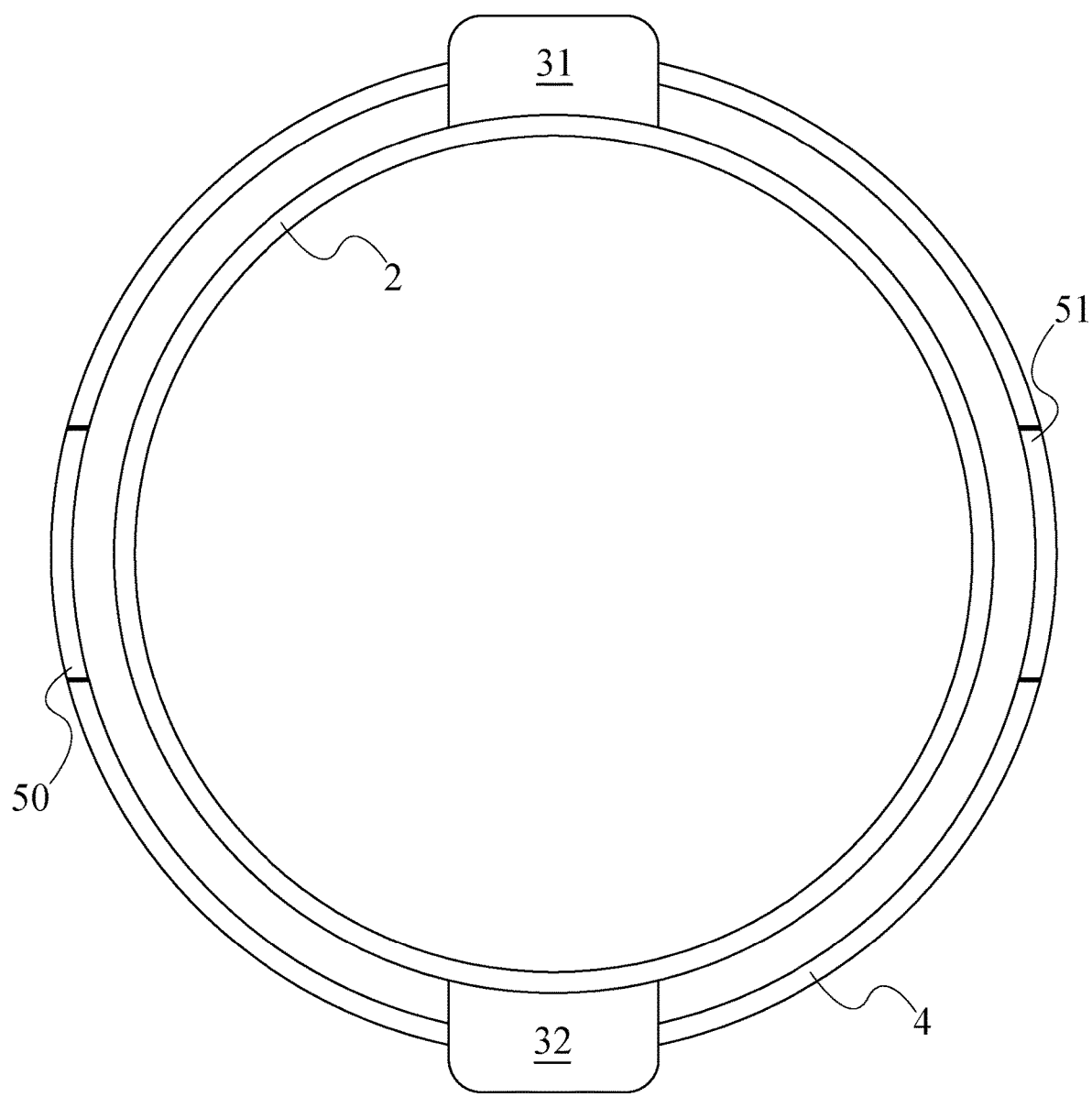
FIG. 11 is a top schematic view representing the perforated drainer of the present invention elevated above the first receptacle.

The perforated drainer 1 needs to be removable in order to facilitate the addition of ingredients and the removal of milk solids and cheese. To this end, the present invention comprises a first tab 31, a second tab 32, a first tab-receiving notch 50, and a second tab-receiving notch 51. The first tab 31 and the second tab 32 are rigid extrusions that allow the user to grasp the perforated drainer 1 without touching the contents. The perforated drainer 1 comprises a drainer rim 2. The drainer rim 2 is the segment of the perforated drainer 1 into which ingredients are added and cheese is eventually removed. The first receptacle 3 comprises a first rim 4. The first rim 4 is the segment of the first receptacle 3 into which the perforated drainer 1 is placed, as seen in FIG. 3. The first tab-receiving notch 50 and the second tab-receiving notch 51 are cuts into the first rim 4 that allow for the first tab 31 and the second tab 32, respectively, to rest during food creation. The first tab 31 is connected adjacent to the drainer rim 2. Similarly, the second tab 32 is connected adjacent to the drainer rim 2, opposite the first tab 31. In this way, the first tab 31 and the second tab 32 are appropriately positioned for convenience in removal. The first tab 31 and the second tab 32 are situated upon the first rim 4. This arrangement ensures that the contents of the perforated drainer 1 are positioned to allow the contents of the perforated drainer 1 to empty into the first receptacle 3 and ensures the ease of removal for the perforated drainer 1. The first tab-receiving notch 50 and the second tab-receiving notch 51 are integrated into the first rim 4. This arrangement enables the first tab 31 and the second tab 32 to rest lower in the first receptacle 3, as seen in FIG. 10. The first tab-receiving notch 50 and the second tab-receiving notch 51 are positioned opposite of each other about the first rim 4. In this way, the user may drain the contents of the perforated drainer 1 by lifting the perforated drainer 1 by the first tab 31 and the second tab 32 out of the first tab-receiving notch 50 and the second tab-receiving notch 51, turning the perforated drainer 1, and resting the first tab 31 and the second tab 32 upon the first rim 4, as seen in FIG. 11, thus creating a gap between the perforated drainer 1 and the first receptacle 3.

Figure 5:
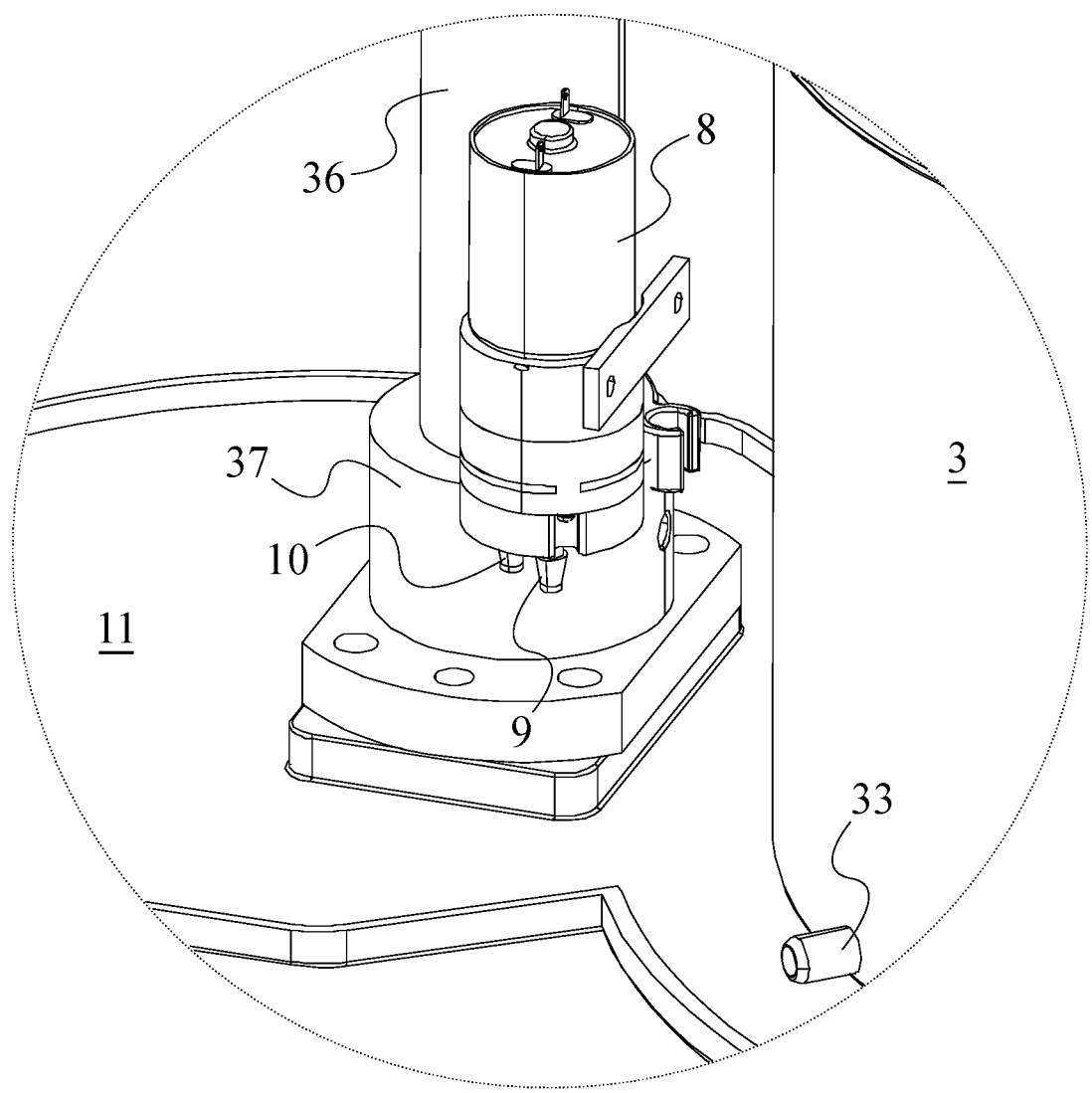
FIG. 5 is a detailed view taken about circle 5 in FIG. 4, wherein FIG. 5 focuses around the fluid pump of the present invention.

During the cheese-making process, processed fluids that are not converted into cheese, including whey as well as some unmixed ingredient remnants, are produced, and must be removed from the cheese curds. To this end, the present invention comprises a first tap 33. The first tap 33 is an opening through which liquid byproducts can flow. The fluid pump 8 comprises a pump inlet 9, as seen in FIG. 5. The pump inlet 9 is an opening through which fluids are driven into the fluid pump 8. The first tap 33 is laterally integrated into the first receptacle 3. This arrangement allows collected whey to exit the first receptacle 3. The first tap 33 is in fluid communication with the pump inlet 9. In this way, fluid flows from the first receptacle 3 through the first tap 33 and the pump inlet 9 into the fluid pump 8. Moreover, the present invention further comprises a second tap 34. The second tap 34 is an opening that allows for the flow of liquid byproducts. The second receptacle 5 comprises a second rim 6. The second rim 6 is the section of the second receptacle 5 through which fluid may enter and exit the second receptacle 5. The fluid pump 8 comprises a pump outlet 10. The pump outlet 10 is a segment that enables fluid to be driven out of the fluid pump 8. The second tap 34 is mounted offset from the structural base 11. This prevents flow backwards from the second receptacle 5 to the fluid pump 8 due to the effects of gravity on liquids within the second receptacle 5. The second tap 34 is positioned adjacent to the second rim 6. In this way, the second tap 34 is positioned optimally for addition of fluid from the fluid pump 8 to the second receptacle 5. The second tap 34 is oriented into the second rim 6. This arrangement allows the fluid to enter the second container without spillage. The pump outlet 10 is in fluid communication with the second tap 34. In this way, fluid from the fluid pump 8 can travel through the pump outlet 10 and the second tap 34 into the second receptacle 5.

As the second receptacle 5 fills with cheese-making byproducts, the user may need to remove the second receptacle 5 to collect or dispose of the contents of the second receptacle 5. For this purpose, the present invention comprises a handle 35, as seen in FIG. 3. The handle 35 is a feature that allows the user to grasp the second receptacle 5 and subsequently remove or replace the second receptacle 5 from the present invention. The second receptacle 5 is removably mounted onto the structural base 11. This arrangement allows the second receptacle 5 to be removed for content management. The handle 35 is laterally integrated into the second receptacle 5. In this way, the user can conveniently grasp and remove the second receptacle 5. To further assist with managing collected whey, the second receptacle 5 comprises a second rim 6 and a flaring spout 7. The second rim 6 is the section of the second receptacle 5 through which fluid may enter and exit the second receptacle 5. The flaring spout 7 is a curved surface that directs the flow of fluids exiting the second receptacle 5. The flaring spout 7 is laterally integrated into the second rim 6. This arrangement positions the flaring spout 7 optimally to provide the user control over the direction of liquid flow from the second receptacle 5.

Figure 4:
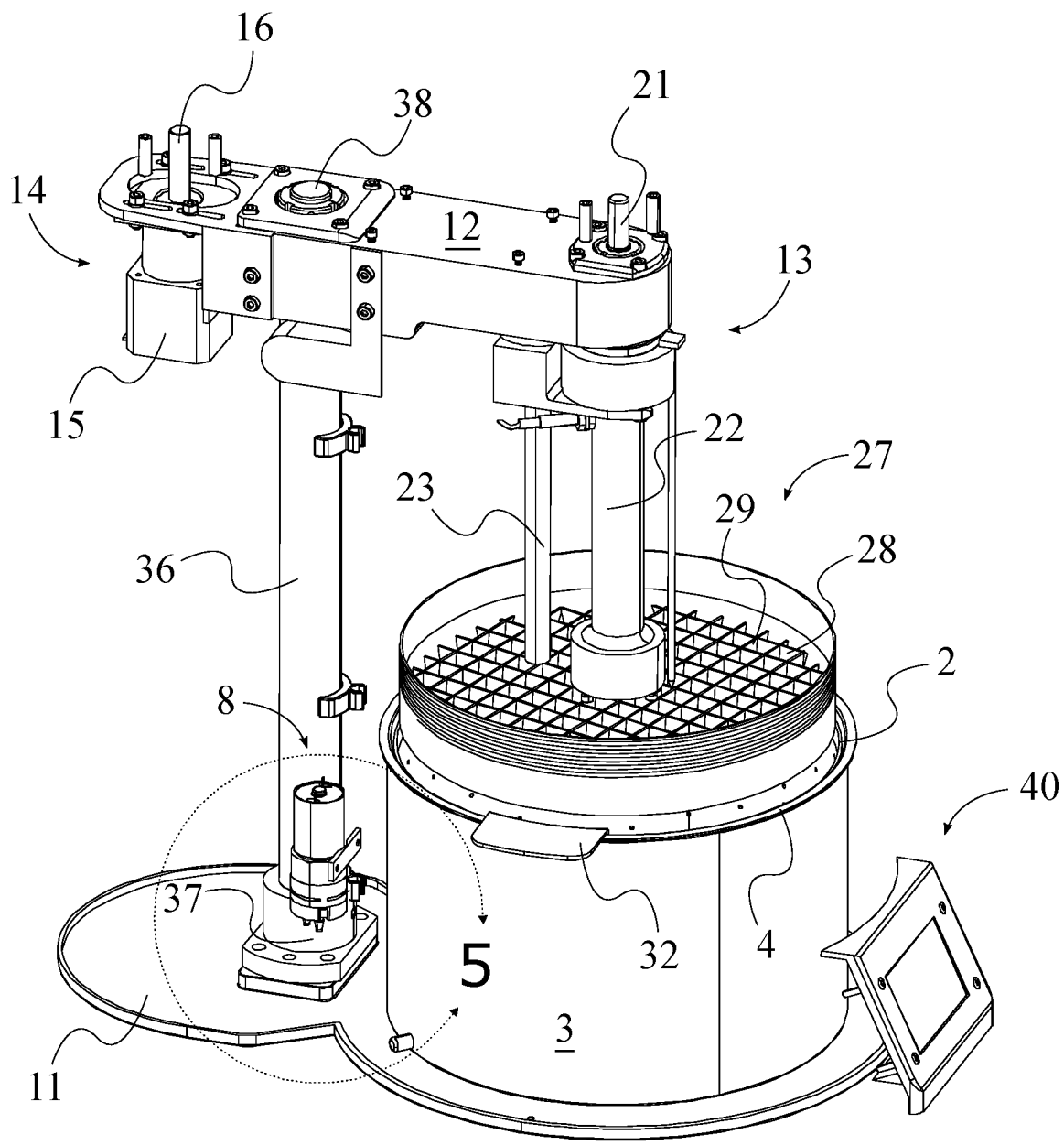
FIG. 4 is a front-left perspective view of the present invention without the cover, the second receptacle, the heater, the first pulley, or the second pulley.

The structural boom 12 is meant to swivel independently of the structural base 11, thus allowing the user access to the perforated drainer 1. To this end, the present invention comprises a structural column 36. The structural column 36 is a rigid cylindrical connector that runs through the present invention, as seen in FIG. 4. The structural column 36 comprises a first column end 37 and a second column end 38. The first column end 37 and the second column end 38 are positioned opposite each other upon the structural column 36. The structural column 36 is positioned normal to the structural base 11. This arrangement results in the structural column 36 extending away from the structural base 11. The first column end 37 is connected onto the structural base 11. In this way, the first column end 37 is positioned opposite the structural boom 12. The structural column 36 is positioned perpendicular to the structural boom 12. Further, the second column end 38 is rotatably connected to the structural boom 12. This arrangement allows the structural boom 12 to swivel independently of the structural base 11 about the structural column 36. In an exemplary embodiment, the structural column 36 is positioned in-between the first receptacle 3 and the second receptacle 5. In this way, the structural boom 12 swivels over the first receptacle 3 and the second receptacle 5.

The linear actuator 13 needs a mechanism for moving the at least one interchangeable food-interacting head 26 to and from the contents of the perforated drainer 1. To this end, the linear actuator 13 comprises a motor 14, a first pulley 17, a second pulley 18, a belt 19, and a cam mechanism 20. The motor 14 is a unit capable of converting electrical energy into mechanical energy. The first pulley 17 receives rotational motion from the motor 14, as seen in FIG. 3. The belt 19 is a high-friction elastic band that transfers rotational motion from the first pulley 17 to the second pulley 18. The cam mechanism 20 is used to convert rotational motion into linear motion. The first pulley 17 and the second pulley 18 are rotatably connected to the structural boom 12. This arrangement enables the first pulley 17 and the second pulley 18 to rotate relative to the structural boom 12. The first pulley 17 and the second pulley 18 are positioned opposite to each other along the structural boom 12. In this way, the present invention may minimize vertical height, thus improving the ability of the present invention to fit upon a countertop. The first pulley 17 and the second pulley 18 are torsionally tethered to each other by the belt 19. This arrangement allows energy to be transferred between the first pulley 17 and the second pulley 18. The motor 14 is operatively coupled to the first pulley 17, wherein the motor 14 is used to rotate the first pulley 17. In this way, the motion of the first pulley 17 is translated to the second pulley 18. The cam mechanism 20 is operatively coupled to the second pulley 18, wherein the second pulley 18 is used to actuate the cam mechanism 20. This arrangement collectively results in the rotational motion of the motor 14 being transferred through the first pulley 17, belt 19, and second pulley 18, to the cam mechanism 20. The at least one interchangeable food-interacting head 26 is operatively coupled to the cam mechanism 20, wherein the cam mechanism 20 is used to slide the at least one interchangeable food-interacting head 26 into and out of the perforated drainer 1. In this way, the at least one interchangeable food-interacting head 26 can move relative to the perforated drainer 1 due to the motion of the motor 14.

Furthermore, the motor 14 comprises a rotor 16 and a stator 15. The rotor 16 is the segment of the motor 14 which rotates, while the stator 15 is the non-moving segment of the motor 14. The stator 15 is laterally connected to the structural boom 12. This allows the stator 15 to remain fixed relative to the structural boom 12. The stator 15 and the first pulley 17 are positioned opposite to each other about the structural boom 12. In this way, the rotor 16 operates on the opposite side of the stator 15. The rotor 16 is torsionally connected to the first pulley 17 through the structural boom 12. This arrangement results in movement of the rotor 16 corresponding to movement of the first pulley 17.

The cam mechanism 20 must be equipped to extend and retract, thus affecting the at least one interchangeable food-interacting head 26. To this end, the cam mechanism 20 comprises a first telescoping member 21, a second telescoping member 22, and a stabilizing track 23. The first telescoping member 21 and the second telescoping member 22 are rigid units that slide relative to each other, as seen in FIG. 1. The stabilizing track 23 is a rigid segment that prevents deviation of the regular motion between the first telescoping member 21 and the second telescoping member 22. The first telescoping member 21 is torsionally connected to the second pulley 18 through the structural boom 12. In this way, the second pulley 18 rotation results in rotation of the first telescoping member 21. The first telescoping member 21 is threadably engaged to the second telescoping member 22. This arrangement results in the conversion of rotational motion from the first telescoping member 21 into linear motion of the second telescoping member 22. The stabilizing track 23 is laterally connected to the structural boom 12. Further, the stabilizing track 23 is positioned parallel to and offset from the second telescoping member 22. In this way, the stabilizing track 23 prevents any deviation from the intended path of the second telescoping member 22 along the first telescoping member 21. The second telescoping member 22 is slidably mounted along the stabilizing track 23. This arrangement allows the second member to move easily towards and away from the second pulley 18. The at least one interchangeable food-interacting head 26 is terminally attached to the second telescoping member 22. In this way, the motion of the second telescoping member 22 results in corresponding motion of the at least one interchangeable food-interacting head 26. In the preferred embodiment, the at least one interchangeable cheese-cutting head is screwed into place. The second telescoping member 22 is positioned in-between the structural boom 12 and the at least one interchangeable food-interacting head 26. This arrangement ensures that the second telescoping member 22 rotates smoothly.

Figure 7:
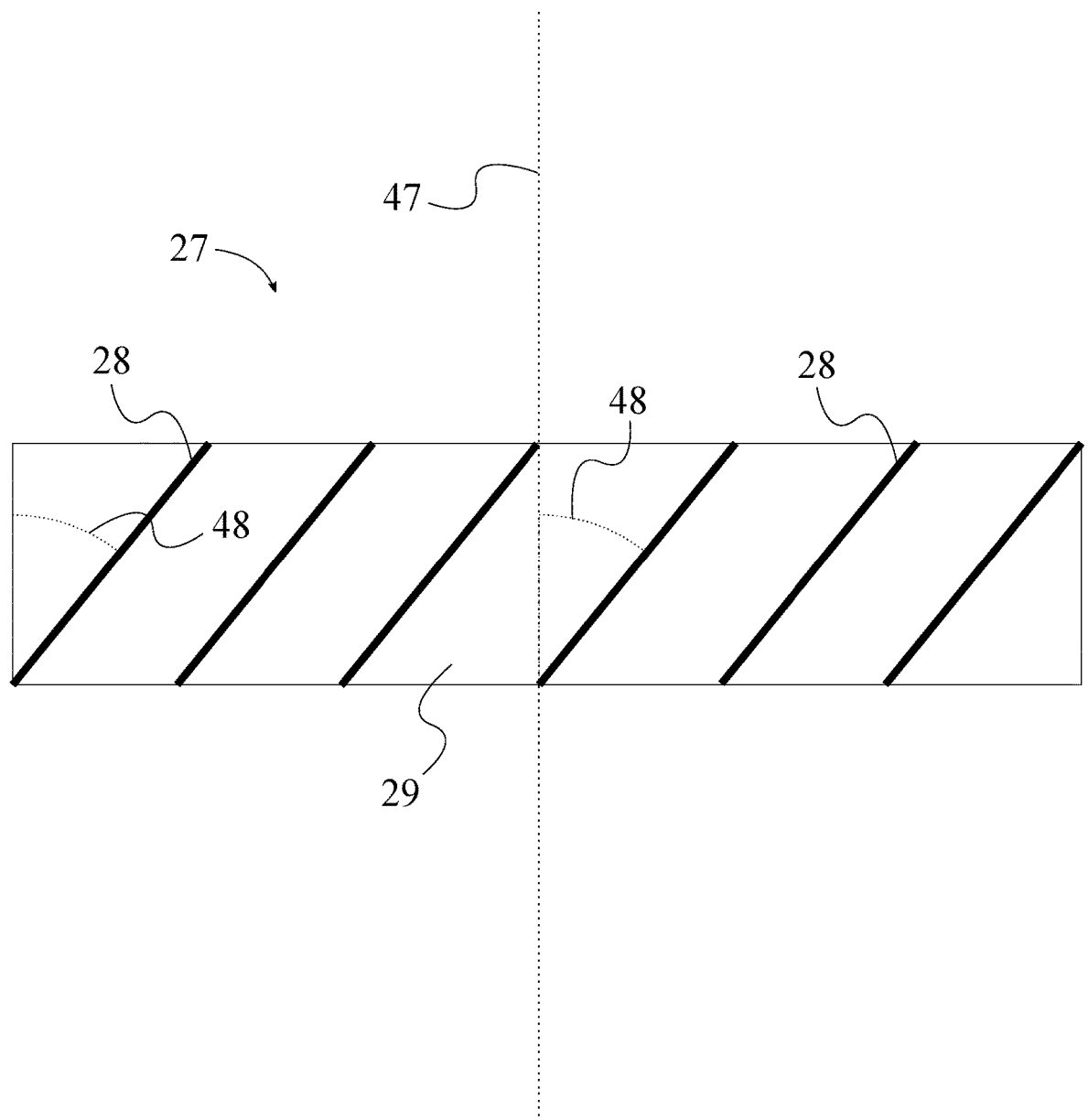
FIG. 7 is a side schematic view representing the cutter of the present invention.
Figure 8:
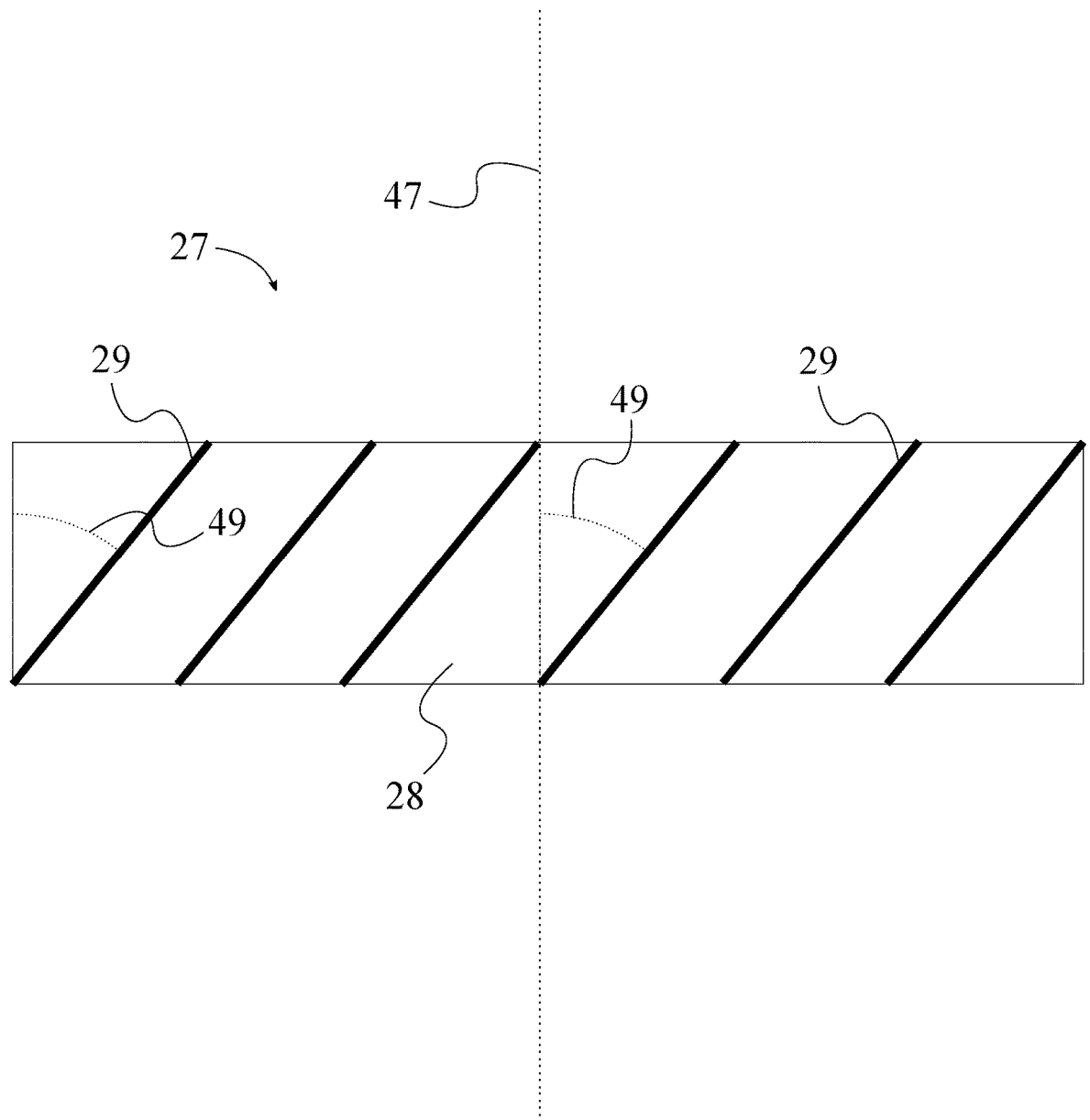
FIG. 8 is a side schematic view representing the cutter of the present invention.
Figure 9:
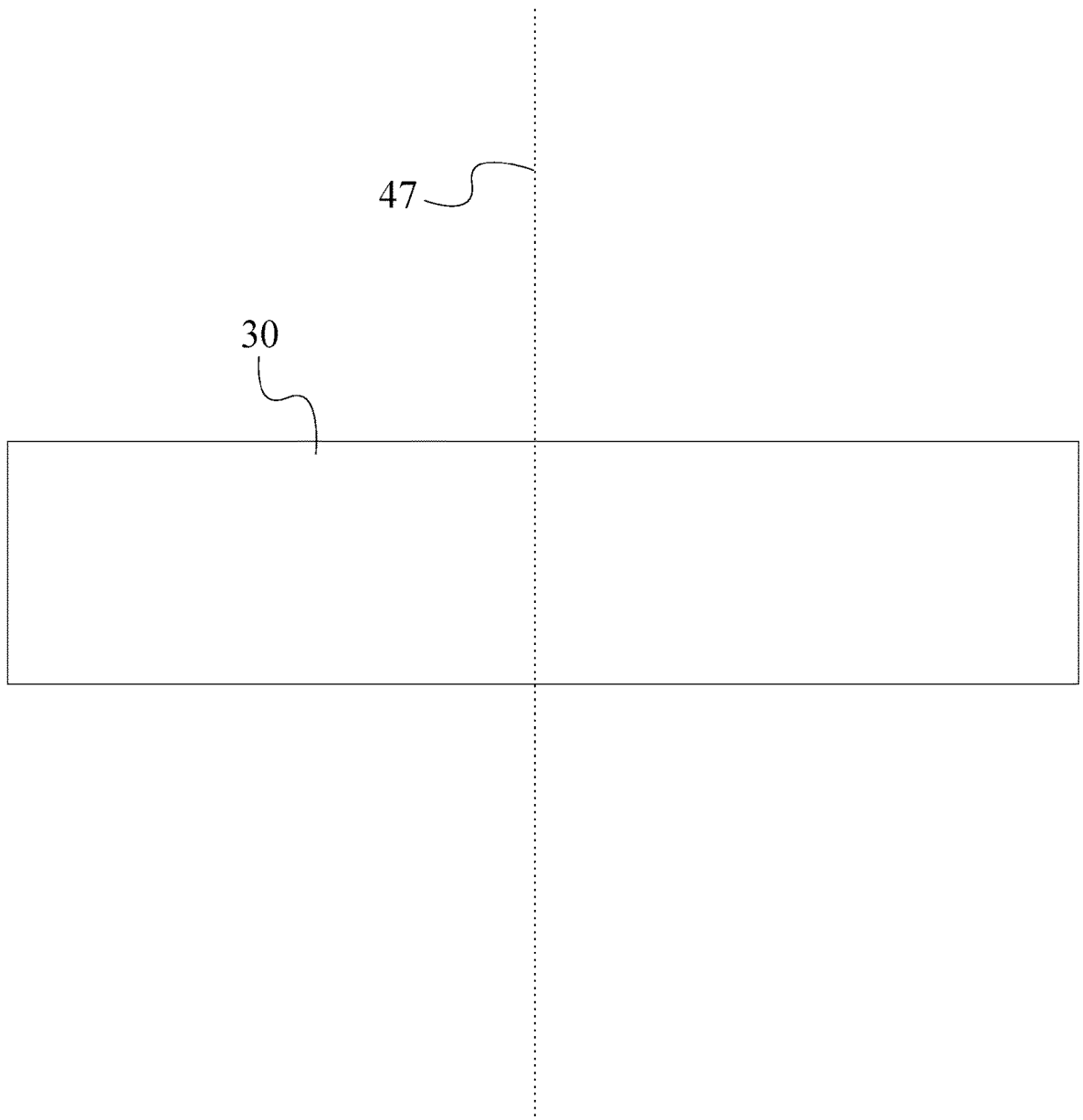
FIG. 9 is a side schematic view representing the press of the present invention.

The present invention must interact with liquids and gelatinous solids in order to be effective at developing cheese and tofu. Correspondingly, the at least one interchangeable food-interacting head 26 comprises a cutter 27. The cutter 27 is a set of blades that can attach to the present invention. The cutter 27 comprises a plurality of first blades 28 and a plurality of second blades 29, as seen in FIG. 4. The plurality of first blades 28 and the plurality of second blades 29 are two sets of sharp-edged cutting tools. The plurality of first blades 28 is positioned perpendicular to the plurality of second blades 29. Further, the plurality of first blades 28 and the plurality of second blades 29 are arranged in a grid configuration. This arrangement is optimal for cutting through thick cheese curds that form. In an exemplary embodiment, each of the plurality of first blades 28 is positioned at a first acute angle 48 with a central axis 47 of the perforated drainer 1, as seen in FIG. 7. Similarly, each of the plurality of second blades 29 is positioned at a second acute angle 49 with the central axis 47 of the perforated drainer 1, as seen in FIG. 8. This arrangement enables the purely linear motion of the at least one interchangeable food-interacting head 26 to produce desirable waves and turbulence in liquid mixtures. In addition, the at least one interchangeable food-interacting head 26 comprises a press 30. The press 30 is a generally flat surface optimized for providing pressure upon the contents of the perforated drainer 1. The press 30 is positioned normal to a central axis 47 of the perforated drainer 1, as seen in FIG. 9. This arrangement ensures the press 30 is adequately arranged for the application of downward force upon the contents of the perforated drainer 1. Such pressure is particularly desirable during the production of hard cheeses, as opposed to softer cheeses.

Figure 2:
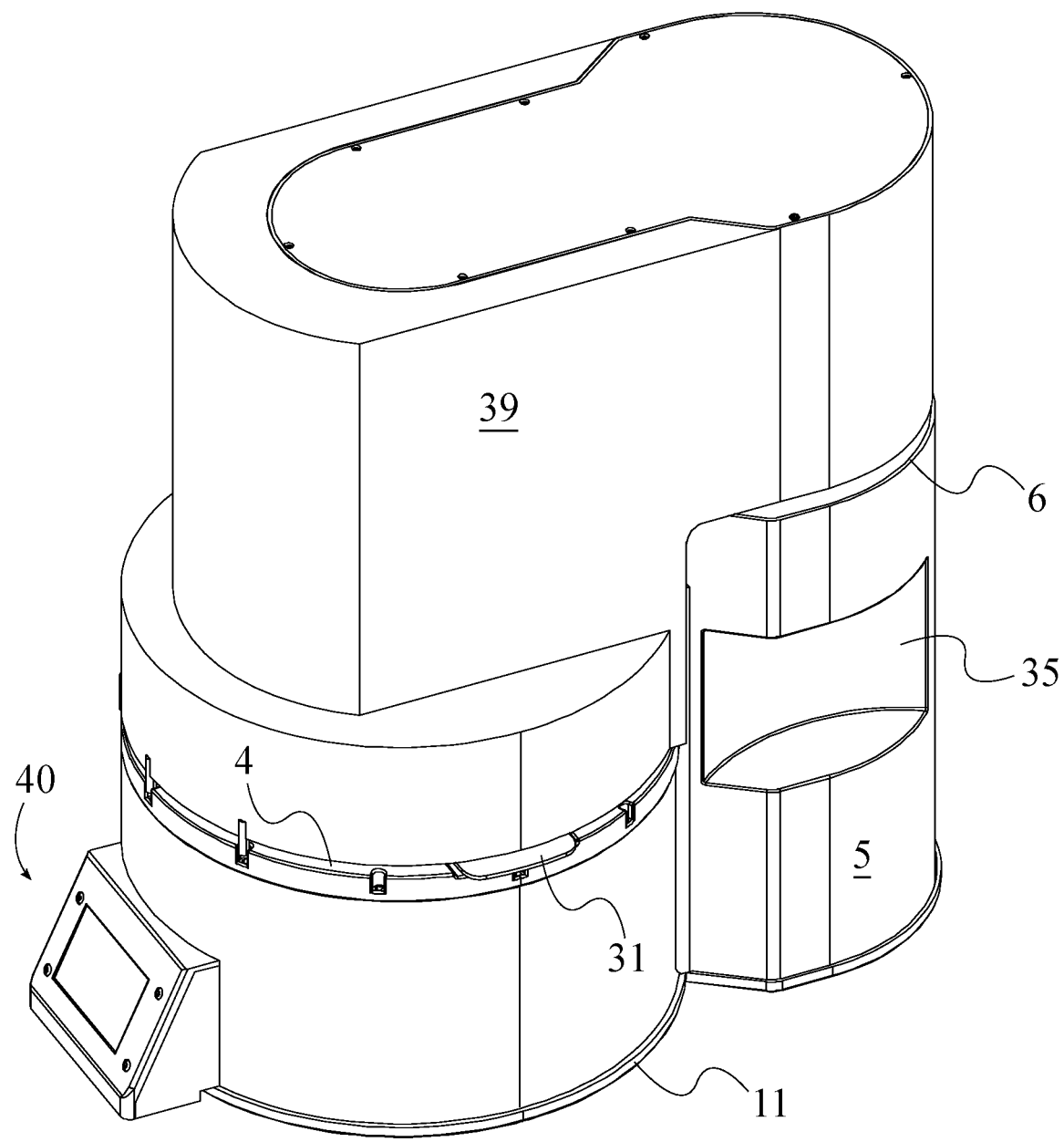
FIG. 2 is a front-right perspective view of the present invention.

The present invention requires a segment that protects the components proximal to and including the structural boom 12. To this end, the present invention comprises a cover 39. The cover 39 is a rigid extrusion that provides protection for the present invention, as seen in FIG. 2. The first receptacle 3 comprises a first rim 4. The first rim 4 is the segment of the first receptacle 3 into which the perforated drainer 1 is placed. The second receptacle 5 comprises a second rim 6. The second rim 6 is the section of the second receptacle 5 through which fluid may enter and exit the second receptacle 5. The structural boom 12, the linear actuator 13, the least one interchangeable food-interacting head, the first rim 4, and the second rim 6 are each housed by the cover 39. In this way, the cover 39 protects each of these components.

The user requires a means of interacting with the present invention. To this end, the present invention comprises a user-interfacing panel 40. The user-interfacing panel 40 is a touchscreen surface that provides options, including pre-set recipes as well as custom controls for applying heat, pressure, time, and agitation to the contained mixture. The user-interfacing panel 40 is mounted onto the structural base 11, as seen in FIG. 4. This arrangement provides a convenient location for inputting instructions and monitoring progress. The user-interfacing panel 40 is electronically connected to the controller 25. In this way, instructions from the user-interfacing panel 40 transfer to the controller 25, and consequently, throughout the present invention. Moreover, the present invention further comprises a wireless communication module 41 and an external computing device 42. The wireless communication module 41 is a device that provides internet connectivity for the present invention. The external computing device 42 can be, but is not limited to, a smartphone, a desktop computer, a laptop computer, or a tablet personal computer with a corresponding application that enables users to interact with the present invention, as well as with each other. The wireless communication module 41 is mounted onto the structural base 11. Furthermore, the wireless communication module 41 is electronically connected to the controller 25. In this way, the controller 25 is equipped to send and receive signals directing the present invention. The wireless communication module 41 is communicably coupled to the external computing device 42. This arrangement results in progress updates being provided to the user, and the user providing instruction to the present invention remotely.

Figure 6:
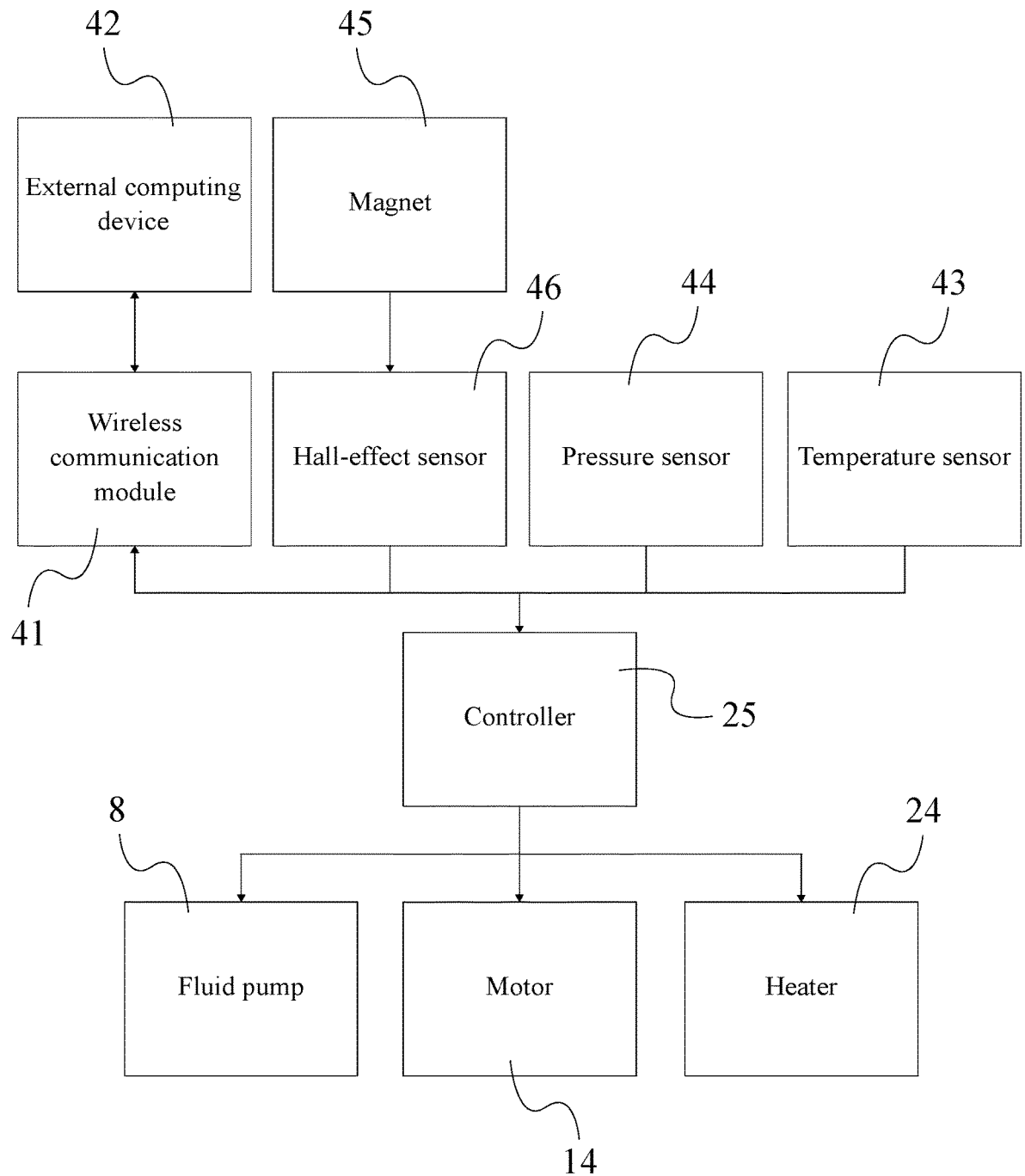
FIG. 6 is a process flow diagram representing the electrical controls of the present invention.

A wide array of sensors may be utilized in order to provide the controller 25 with feedback regarding the status of food preparation. To this end, the present invention comprises a temperature sensor 43, as seen in FIG. 6. The temperature sensor 43 is an electronic device capable of capturing data regarding thermal energy and converting that data into corresponding electrical signals. The temperature sensor 43 is in thermal communication with the first receptacle 3. This arrangement allows the temperature sensor 43 to read the temperature of the first receptacle 3, and consequently, of the perforated drainer 1. The temperature sensor 43 is electronically connected to the controller 25. This arrangement enables the temperature sensor 43 to relay collected data to the controller 25. The present invention further comprises a pressure sensor 44. The pressure sensor 44 is an electronic device capable of capturing data regarding mechanical pressure and converting that data into corresponding electrical signals. The pressure sensor 44 is pressed in-between the first receptacle 3 and the structural base 11. This positioning allows the pressure sensor 44 to capture data regarding the weight of items within the first receptacle 3. The pressure sensor 44 is electronically connected to the controller 25. This arrangement enables the pressure sensor 44 to relay collected data to the controller 25. The present invention further comprises a magnet 45 and a Hall-effect sensor 46. The magnet 45 is a metal unit that emits a magnetic field. The Hall-effect sensor 46 is a device capable of measuring distance from a magnet 45 through the magnetic field generated by that magnet 45. The magnet 45 is integrated into the at least one interchangeable food-interacting head 26. Correspondingly, the Hall-effect sensor 46 is mounted in-between the first receptacle 3 and the structural base 11. In this way, the magnet 45 and the Hall-effect sensor 46 are positioned appropriately to measure the distance between the at least one interchangeable food-interacting head 26 and the bottom of the first receptacle 3. The Hall-effect sensor 46 is electronically connected to the controller 25. This arrangement enables the Hall-effect sensor 46 to relay collected data to the controller 25.

Although the invention has been explained in relation to its preferred embodiment, it is to be understood that many other possible modifications and variations can be made without departing from the spirit and scope of the invention as hereinafter claimed.

What is claimed is:

1. A countertop cooking appliance comprising:
a perforated drainer;
a first receptacle;
a second receptacle;
a fluid pump;
a structural base;
a structural boom;
a linear actuator;
a heater;
a controller;
at least one interchangeable food-interacting head;
the first receptacle, the second receptacle, and the fluid pump being mounted onto the structural base;
the perforated drainer being situated within the first receptacle;
the heater being in thermal communication with the first receptacle;
the first receptacle and the second receptacle being in fluid communication with each other through the fluid pump;

the structural boom being rotatably connected to the structural base;

the structural boom being positioned offset from the first receptacle and the second receptacle;

the at least one interchangeable food-interacting head being operatively mounted to the structural boom by the linear actuator, wherein the linear actuator is used to slide the at least one interchangeable food-interacting head into and out of the perforated drainer; and the controller being electronically connected to the heater, the fluid pump, and the linear actuator.

2. The countertop cooking appliance as claimed in claim 1 further comprising:

a first tab;

a second tab;

a first tab-receiving notch;

a second tab-receiving notch;

the perforated drainer comprising a drainer rim;

the first receptacle comprising a first rim;

the first tab being connected adjacent to the drainer rim;

the second tab being connected adjacent to the drainer rim, opposite the first tab;

the first tab and the second tab being situated upon the first rim;

the first tab-receiving notch and the second tab-receiving notch being integrated into the first rim; and the first tab-receiving notch and the second tab-receiving notch being positioned opposite of each other about the first rim.

3. The countertop cooking appliance as claimed in claim 1 further comprising:

a first tap;

the fluid pump comprising a pump inlet;

the first tap being laterally integrated into the first receptacle; and the first tap being in fluid communication with the pump inlet.

4. The countertop cooking appliance as claimed in claim 1 further comprising:

a second tap;

the second receptacle comprising a second rim;

the fluid pump comprising a pump outlet;

the second tap being mounted offset from the structural base;

the second tap being positioned adjacent to the second rim;

the second tap being oriented into the second rim; and the pump outlet being in fluid communication with the second tap.

5. The countertop cooking appliance as claimed in claim 1 further comprising:

a handle;

the second receptacle being removably mounted onto the structural base; and the handle being laterally integrated into the second receptacle.

6. The countertop cooking appliance as claimed in claim 1 further comprising:

the second receptacle comprising a second rim and a flaring spout; and the flaring spout being laterally integrated into the second rim.

7. The countertop cooking appliance as claimed in claim 1 further comprising:

a structural column;

the structural column comprising a first column end and a second column end;

the structural column being positioned normal to the structural base;

the first column end being connected onto the structural base;

the structural column being positioned perpendicular to the structural boom; and the second column end being rotatably connected to the structural boom.

8. The countertop cooking appliance as claimed in claim 7 further comprising:

the structural column being positioned in-between the first receptacle and the second receptacle.

9. The countertop cooking appliance as claimed in claim 1 further comprising:

the linear actuator comprising a motor, a first pulley, a second pulley, a belt, and a cam mechanism;

the first pulley and the second pulley being rotatably connected to the structural boom;

the first pulley and the second pulley being positioned opposite to each other along the structural boom;

the first pulley and the second pulley being torsionally tethered to each other by the belt;

the motor being operatively coupled to the first pulley, wherein the motor is used to rotate the first pulley;

the cam mechanism being operatively coupled to the second pulley, wherein the second pulley is used to actuate the cam mechanism; and the at least one interchangeable food-interacting head being operatively coupled to the cam mechanism, wherein the cam mechanism is used to slide the at least one interchangeable food-interacting head into and out of the perforated drainer.

10. The countertop cooking appliance as claimed in claim 9 further comprising:

the motor comprising a stator and a rotor;

the stator being laterally connected to the structural boom;

the stator and the first pulley being positioned opposite to each other about the structural boom; and the rotor being torsionally connected to the first pulley through the structural boom.

11. The countertop cooking appliance as claimed in claim 9 further comprising:

the cam mechanism comprising a first telescoping member, a second telescoping member, and a stabilizing track;

the first telescoping member being torsionally connected to the second pulley through the structural boom;

the first telescoping member being threadably engaged to the second telescoping member;

the stabilizing track being laterally connected to the structural boom;

the stabilizing track being positioned parallel to and offset from the second telescoping member;

the second telescoping member being slidably mounted along the stabilizing track;

the at least one interchangeable food-interacting head being terminally attached to the second telescoping member; and the second telescoping member being positioned in-between the structural boom and the at least one interchangeable food-interacting head.

12. The countertop cooking appliance as claimed in claim 1 further comprising:

the at least one interchangeable food-interacting head comprising a cutter;

the cutter comprising a plurality of first blades and a plurality of second blades;

the plurality of first blades being positioned perpendicular to the plurality of second blades; and the plurality of first blades and the plurality of second blades being arranged in a grid configuration.

13. The countertop cooking appliance as claimed in claim 12 further comprising:

each of the plurality of first blades being positioned at a first acute angle with a central axis of the perforated drainer; and each of the plurality of second blades being positioned at a second acute angle with the central axis of the perforated drainer.

14. The countertop cooking appliance as claimed in claim 1 further comprising:

the at least one interchangeable food-interacting head comprising a press; and the press being positioned normal to a central axis of the perforated drainer.

15. The countertop cooking appliance as claimed in claim 1 further comprising:

a cover;

the first receptacle comprising a first rim;

the second receptacle comprising a second rim; and the structural boom, the linear actuator, the least one interchangeable food-interacting head, the first rim, and the second rim being housed by the cover.

16. The countertop cooking appliance as claimed in claim 1 further comprising:

a user-interfacing panel;

the user-interfacing panel being mounted onto the structural base; and the user-interfacing panel being electronically connected to the controller.

17. The countertop cooking appliance as claimed in claim 1 further comprising:

a wireless communication module;

an external computing device;

the wireless communication module being mounted onto the structural base;

the wireless communication module being electronically connected to the controller; and the wireless communication module being communicably coupled to the external computing device.

18. The countertop cooking appliance as claimed in claim 1 further comprising:

a temperature sensor;

the temperature sensor being in thermal communication with the first receptacle; and the temperature sensor being electronically connected to the controller.

19. The countertop cooking appliance as claimed in claim 1 further comprising:

a pressure sensor;

the pressure sensor being pressed in-between the first receptacle and the structural base; and the pressure sensor being electronically connected to the controller.

20. The countertop cooking appliance as claimed in claim 1 further comprising:

a magnet;

a Hall-effect sensor;

the magnet being integrated into the at least one interchangeable food-interacting head;

the Hall-effect sensor being mounted in-between the first receptacle and the structural base; and the Hall-effect sensor being electronically connected to the controller.

\* \* \* \* \*